J. MOIR.
SHOCK ABSORBER FOR VEHICLES.
APPLICATION FILED JULY 20, 1911.
1,099,073.
Patented June 2, 1914.
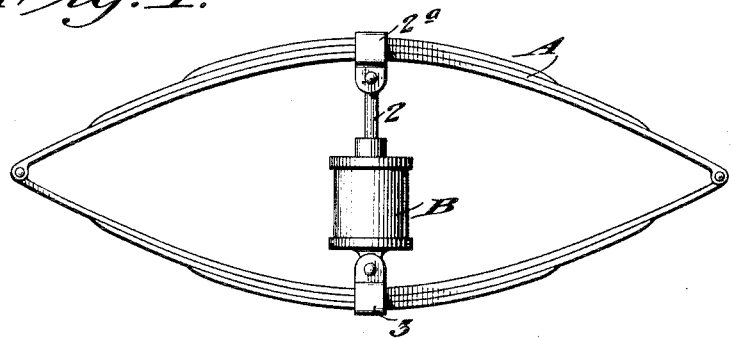
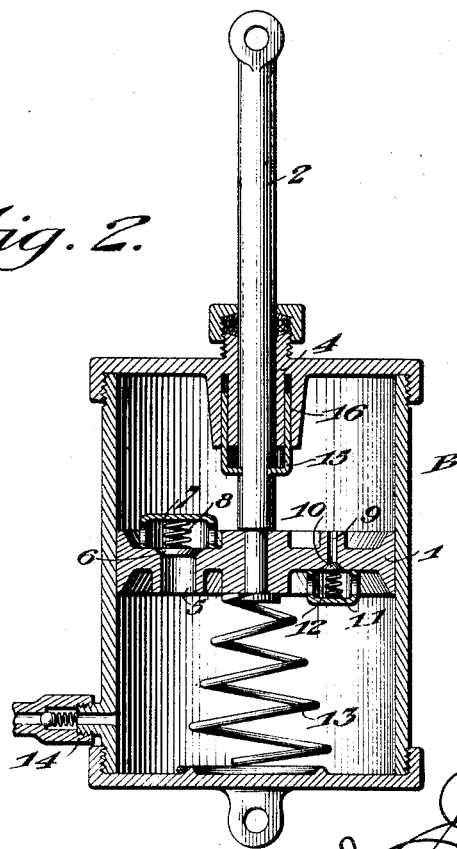

UNITED STATES PATENT OFFICE.

JAMES MOIR, OF BURLINGTON, IOWA.

SHOCK-ABSORBER FOR VEHICLES.

1,099,073.  Specification of Letters Patent.  Patented June 2, 1914.

Application filed July 20, 1911. Serial No. 639,627.

*To all whom it may concern:*

Be it known that I, JAMES MOIR, a citizen of the United States, residing at Burlington, in the county of Des Moines and State of Iowa, have invented certain new and useful Improvements in Shock-Absorbers for Vehicles, of which the following is a specification.

My invention relates to an improvement in shock absorbers for vehicles, and the object is to provide means whereby the air in the cylinder will be equalized on each side of the piston for the purpose of absorbing the shock of the pressure in the lower end of the cylinder, and the rebound in the upper end of the cylinder. It is commonly known when the springs or cushions introduced between the running gear and the body and load carried are thus compressed or extended abnormally, by passing over obstructions, that work is thereby stored in them which they immediately throw off by rebounding, the rebound often being nearly as severe or sudden as the rise, and under some circumstances possibly more sudden and through a greater amplitude.

The purpose of this invention is to reduce the severity of this rebound, namely to increase the space of time during which the springs or cushions will return to their normal conditions, while not decreasing the time taken by the said springs or cushions in allowing the wheels and running-gear to rise.

The invention still further consists in certain novel features of construction and combinations of parts which will be hereinafter fully described and pointed out in the claim.

In the accompanying drawings:—Figure 1 is a view in side elevation of the invention, showing it applied to an elliptical spring, and Fig. 2 is a vertical sectional view of the invention.

A, represents an elliptical spring, and B is a cylinder having piston-head 1 therein, to which is connected piston rod 2, the piston rod being pivotally connected to the upper leaves of the spring by means of a clamp-head 2ª. The bottom or lower end of the cylinder is also pivotally connected to the lower leaves of the spring by means of a clamp 3. A suitable stuffing-box 4 is provided around the piston rod to prevent the escape of air as the piston is worked in the cylinder. This stuffing box can be of any approved construction, but I have shown what might be called a labyrinthine stuffing box in which a collar 15, secured to the piston rod 2, slides in a groove 16 formed in the boss projecting from the lower side of the upper cylinder head. The piston is provided with a large opening 5 therethrough, in which a valve 6 is seated, a cage 7 being mounted over the opening, and received between the cage and valve is a spring 8, which normally holds the valve 6 on its seat. The valve 6 is raised by the compressed air in the lower part of the cylinder, and allows the air to pass through the piston-head into the upper part of the cylinder. The piston is also provided with another opening 9 of less diameter than that of opening 5. A valve 10 is normally seated over the opening 9, and is located on the opposite side of the piston from the valve 6, where it is held upon its seat by a spring 11 interposed between the valve and the cage 12 which latter is connected to the piston. The spring 8 is made comparatively weak, as it is intended primarily to hold the valve 6 in place and it is not desirable that great resistance be offered to the opening of this valve, the spring 11, however, would be constructed to bring a strong pressure to bear against the valve 10, as this valve is intended to offer resistance to the escape of the fluid through the opening 9, into the lower end of the cylinder, and thus cushion or retard the return of the vehicle spring on the rebound. It will be evident that as it is found desirable to retard this movement to a greater or less degree to meet varying conditions under which the spring A is worked, the spring 11 can be varied as to strength and greater or less resistance offered to the opening of valve 10. The several valves might be either single or double-acting, or a multiplicity of valves could be used to accomplish these results. A spiral spring 13 is located in the lower end of the cylinder, and one end of the spring bears against the piston, forming a cushion for the piston as it moves toward the lower end of the cylinder, causing the spring to be compressed, and the spring assists in forcing the piston back to its normal position after it has made its downward stroke. The cylinder is provided with a valve-controlled inlet tube 14 which, at its other extremity is connected with any suitable compressing means (not shown) whereby to supply compressed air to the cylinder.

Assuming that the vehicle has struck an obstruction, the spring A will be compressed, due to the load carried by the spring, thereby forcing the piston downward. The opening 5 being of a larger diameter than opening 9, allows a great quantity of the air from the lower end of the cylinder to pass through the piston to the upper end of the cylinder, and as the air enters the upper end of the cylinder, it will be confined therein, as a greater quantity will pass through the opening 5 than can pass into the lower end of the cylinder through opening 9; and first a sufficient quantity of air will be required to enter the upper end of the cylinder before valve 10 will open to allow the air to enter the lower end of the cylinder. The air, however, which is in the lower end of the cylinder, and the spring 13, will absorb a great deal of the shock as the piston makes its downward movement, but as a great quantity of air has been admitted to the upper end of the cylinder, the shock imparted to the vehicle body upon the rebound is absorbed by the air in the upper end of the cylinder as the piston moves upwardly, for the reason that only a small amount of the air will enter the lower chamber or end of the cylinder upon the forward movement of the piston, because the opening 9 is of less diameter than the inlet opening 5. Therefore the pressure in the opposite ends of the cylinder will be equalized, as the air in the upper end of the cylinder will be gradually forced into the lower end of the cylinder through the opening 9. If the valve 6 is of greater size than the valve 10, the valve 6 will not be raised by the air entering the lower end of the cylinder through opening 9 on the upward movement of the piston, thereby equalizing the pressure or compression of air in both ends of the cylinders at all times to receive any shocks which are imparted to the vehicle. The air being compressed on both sides of the piston, forms a cushion which absorbs little shocks as well as large, even though the shock be so sudden that the valves would not have time to do their work. It has the advantage not only of holding the load firm, but also has the advantage that when an extremely large shock comes, the double-acting valves will give even more play. Therefore, when a shock comes, part of it will be absorbed by the pressure of the air in the lower end of the cylinder, and part of it will be absorbed by some of the compressed fluid escaping through the valves.

Although I have described the fluid contents of the cylinder as being compressed air, it is evident that the cylinder might be filled with gas, or a liquid such as oil or water.

From the foregoing, it will be seen that I have provided a device which can be applied to any character of vehicle for absorbing shocks, and the principle involved is the equalizing of the fluid pressure, that is, if the pressure is greater in one chamber, it will automatically adjust itself. Upon receiving the shocks, the shock will force the air into the upper half of the cylinder, and the compression will be greater in the upper part of the cylinder after the shock, and when the shock is released, the air will automatically adjust itself to equalize itself in both ends of the cylinder.

Having fully described my invention, what I claim as new and desire to secure by Letters Patent, is:—

In a shock absorber, the combination with a cylinder, of a piston having a large and a small port therein, a valve located on one side of the piston for closing the large port, a second valve located on the opposite side of the piston for closing the small port, a strong spring positioned to bear against small valve and offer resistance to the unseating thereof, a weak spring acting to hold the large valve normally closed, said spring acting to offer little resistance to the opening of this valve and the flow of air therethrough, and a cushion spring located between the piston and the cylinder head on the side from the large valve.

In testimony whereof I affix my signature, in the presence of two witnesses.

JAMES MOIR.

Witnesses:
C. E. WEHMAN,
G. F. DEMPSEY.